April 15, 1958     F. B. DOYLE     2,830,803
FLOATING WEIGH CARRIAGE FOR A SCALE CONVEYOR
Filed April 9, 1956
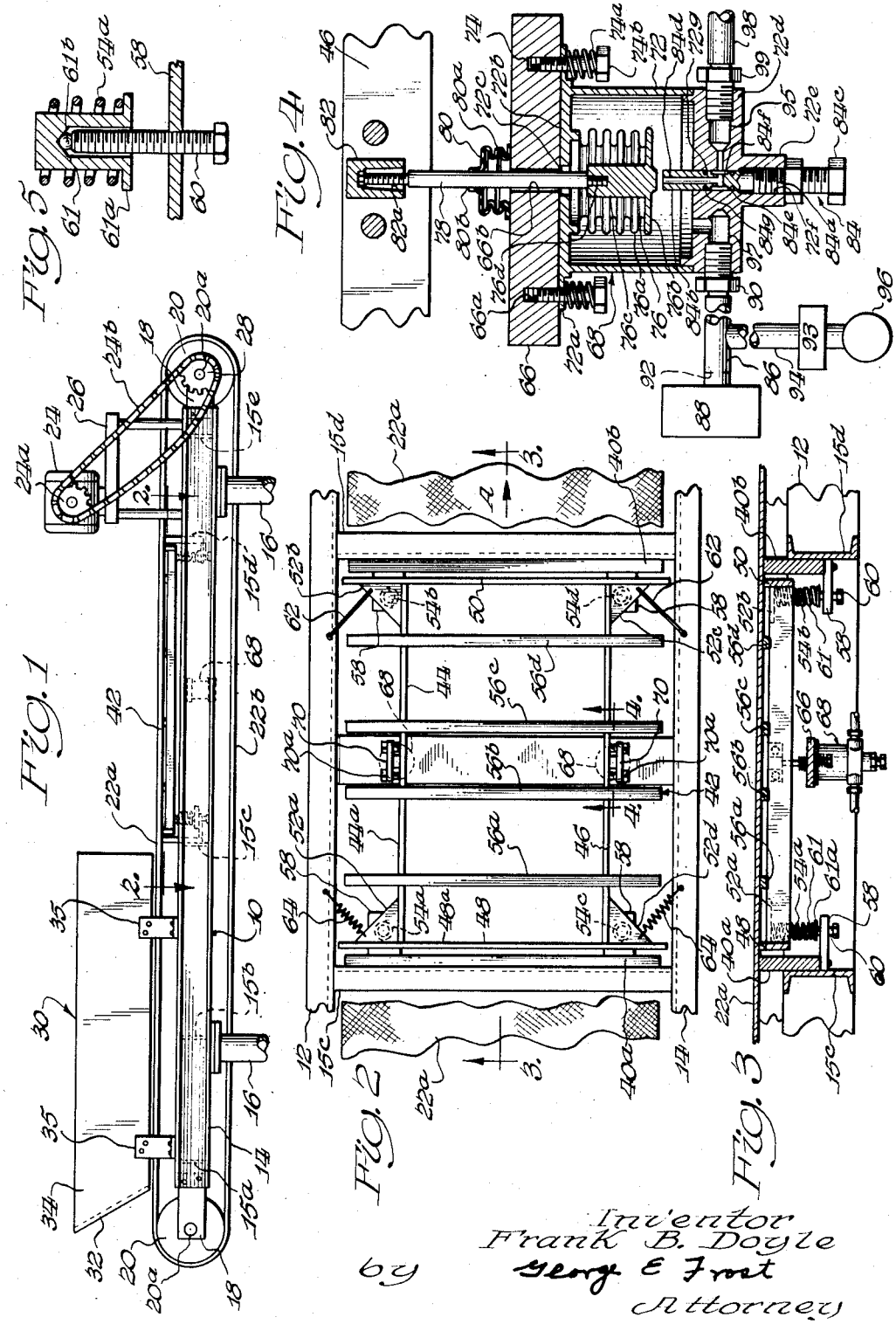
Inventor
Frank B. Doyle
by George E. Frost
Attorney Patented Apr. 15, 1958

2,830,803

FLOATING WEIGH CARRIAGE FOR A SCALE CONVEYOR

Frank B. Doyle, Raymond, Ill.

Application April 9, 1956, Serial No. 576,948

4 Claims. (Cl. 265—28)

My invention relates to a scale conveyor having a floating weigh carriage mounted solely on springs, the weigh carriage having no fixed vertical support.

In scale conveyors the use of a fixed vertical support such as a knife edge, or hinged joint, for the weigh carriage, materially reduces the sensitivity of the scale. In the present invention a scale conveyor is provided with a floating weigh carriage which makes it particularly suitable for weighing light material. In brief, a frame carries a continuous conveyor belt driven on rollers mounted on the frame. When the frame is installed in horizontal alignment the upper portion of the conveyor belt travels in a horizontal plane and passes over a horizontal weigh carriage carried within the frame. The weigh carriage is held in floating relation to the frame by means of springs which operate in a direction normal to the plane of the weigh carriage and are mounted on the frame. When no external load is applied to the carriage, the carriage floats in an initial position immediately below the upper portion of the conveyor belt. Sensing elements mounted on the frame have movable feeler rods connected to the carriage. The sensing elements cooperatively control the pressure of air in a load carrying cylinder-diaphragm device which serves to restore the platform to essentially its initial position.

The weight of material carried on the portion of the conveyor belt resting on the platform depresses the platform. This depresses the feeler rod of the sensing element to vary the air pressure applied to the load carrying cylinder until the carriage returns to essentially its initial position. Indicating means, responsive to the air or fluid pressure in the load carrying cylinder, provide the weight of the material conveyed.

It is therefore a general object of the present invention to provide an improved scale conveyor sensitive to light loads.

It is another object of the present invention to provide a scale conveyor having a floating weigh carriage which is adjustable to predetermined regulated position by means independent of the weight measuring device to compensate for initial weight of the mechanism and belt.

It is a further object of the present invention to provide an improved scale conveyor mechanism which accurately measures the load on a predetermined length of belt; maintains the carriage at accurate weighing height at all times; sustains the carriage without the use of hinges, knife edges, or the like; is of simple, reliable and inexpensive construction; and provides a weight indication in the form of a varying fluid pressure suitable for operation of conventional weight indicating and recording instruments.

The novel features which I believe to be characteristic of my invention are set forth with particularity in the appended claims. My invention itself, however, both as to organization and method of operation, together with further objects and advantages thereof, will be best understood by reference to the following description taken in conjunction with the accompanying drawings in which:

Figure 1 is an elevational view of the scale conveyor of the present invention;

Figure 2 is a view through section 2—2 of Figure 1.

Figure 3 is a view through section 3—3 of Figure 2;

Figure 4 is an enlarged cross-sectional view of the sensing element; and

Figure 5 is an enlarged cross-sectional view showing the springs mounted on the frame.

The scale conveyor of the present invention is shown in Figure 1. The conveyor has a frame shown generally at 10 which has longitudinal side members 12 and 14 which may be channel members as shown. The frame has a plurality of lateral members 15a, 15b, 15c, 15d and 15e, which may also be channel members. These lateral members are connected at either end to the longitudinal side members 12 and 14 respectively. The frame is supported by leg members 16 as shown. The longitudinal side members 12 and 14 each have end plates 18 connected to them at each end which extend longitudinally from the end of the member to which they are connected. A roller 20 is rotatably carried between each pair of end plates 18. The roller 20 has an axial shaft 20a which rotatably rides in holes in the end plates 18. A continuous conveyor belt having upper portion 22a and lower portion 22b is carried on the rollers. The conveyor belt is driven by a drive motor 24 carried on platform 26. The drive shaft of the motor 24 carries sprocket 24a which is connected, by chain 24b, to sprocket 28, carried on one of the roller shafts 20. At one end of the conveyor frame there is a hopper shown generally at 30. The hopper has a sloping end panel 32 and side panels 34. The panels are held above the conveyor belt by brackets 35 which are connected to the frame.

The weighing mechanism of the scale conveyor is located between two adjacent lateral frame members 15c and 15d which are spaced from the hopper in the direction of belt travel as shown in Figure 1. Two bars, 40a and 40b, are connected to the lateral frame members 15c and 15d, respectively, on the sides of the frame members facing each other as shown in Figure 2. The bars 40a and 40b extend laterally substantially the whole distance between longitudinal frame members 12 and 14, and are connected to the lateral members so that the top face of the bar 40a is above the top face of the lateral frame member 15c and the top face of bar 40b is above the top face of lateral member 15d as shown in Figure 3.

The weigh carriage, shown generally at 42, is received within the opening defined by bars 40a, 40b and longitudinal members 12 and 14 as shown in Figures 2 and 3. The carriage has two longitudinal members 44 and 46 and two lateral end members 48 and 50. A triangular plate 52a is welded between the inner face 48a of bar 48 and the outer face 44a of longitudinal member 44 as shown in Figure 2. Like triangular plates 52b, 52c and 52d are similarly connected to the longitudinal members and the end members in each of the other corners of the weigh carriage. Springs 54a, 54b, 54c and 54d are received in recesses in the lower side of triangular plates 52a, 52b, 52c and 52d respectively with their axis normal to the plates. The carriage has lateral members 56a, 56b, 56c and 56d connected to the longitudinal members 44 and 46 at spaced intervals between the lateral end plates 48 and 50.

Support plates 58 are connected to the lower edge of bars 40a and 40b adjacent the springs 54a, 54b, 54c and 54d as shown in Figures 2 and 3. Each support plate 58 threadedly receives a finely threaded set screw 60. A cup 61 having a flange 61a around its open end is rotatably received over the set screw 60 as shown in Figure 5. The springs 54a, 54b, 54c, and 54d are each received telescopically over the cup 61 and seat on flange 61a. A ball 61b is interposed between the top of set screw 60 and the cup 61, as shown in Figure 5, to render the set screw 60 freely rotatable in cup 61 and thereby prevent twisting of the springs when the set screw 60 is adjusted.

A wire 62 connected to the triangular plate 52b is attached to the longitudinal frame member 12 at a point spaced longitudinally in the direction opposite the direction of belt travel from the connection of the wire to the triangular plate. A similar wire 62 connects the triangular plate 52c to the longitudinal frame member 14. The spring 64 is connected to the triangular plate 52a at one end and at the other end is connected to the longitudinal frame member 12 at a point spaced longitudinally in the direction of belt travel from the connection to the triangular plate. A similar spring 64 likewise connects triangular plate 52d to longitudinal frame member 14.

A support bar 66 (see Figure 3) extends laterally across the frame and is connected at either end to longitudinal members 12 and 14, respectively. The support bar 66 is positioned below the weigh carriage 42 midway between bars 40a and 40b. A clamp bar 70 is connected to the outer face of each longitudinal carriage member 44 and 46 (see Figure 2). The clamp bar 70 has two holes which slidably receive bolts 70a. The bolts 70a are threadedly received in the longitudinal members 44 and 46.

The lateral support bar 66 carries two sensing elements, shown generally at 68, Figure 3, directly below the longitudinal carriage members 44 and 46. As shown in Figure 4 each sensing element has a cylindrical housing 72 carried below the support bar 66. The housing 72 has top portion 72b having an outwardly extending flange 72a. Bolts 74 slidably received in holes in the flange 72a are threadedly engaged in holes 66a in the lateral support bar 66. Springs 74a carried on the bolts 74 between the bolt head 74b and the flange 72a urge the top portion of the housing against the support bar 66. The top portion 72b of the housing has a central hole 72c which is aligned with the hole 66b in support bar 66. Inside the housing 72 a metal bellows 76, generally cylindrical in shape, but having circumferential pleats 76a, is secured to the lower surface of the top portion 72b to surround the hole 72c. At the lower end of the bellows 76 there is a pressure plate 76b. The pressure plate has a centrally disposed upstanding cylindrical section 76c having in its upper end a longitudinal threaded hole 76d. A feeler rod 78 having a threaded section at one end is threadedly engaged in the hole 76d and extends through the holes 72c in the top portion of the housing and hole 66b in the support bar. A cylindrical shaped dust guard 80 having circumferential pleats 80a is mounted on the top surface of the support bar 66 surrounding the hole 66b. The feeler rod 78 passes through a sealed hole 80b in the top surface of the dust guard 80. A socket 82 having a square cross-section and a hole 82a drilled from one end slidably fits over the top end of feeler rod 78.

The housing 72 has a disc shaped base 72d having a centrally disposed boss 72e on its outer surface. A passage extends through the boss 72e and the base 72d into the interior of the housing, the portion of the passage 72f extending through the boss being threaded and slightly greater in diameter than the other portion of the passage 72g extending through the base 72d.

A nozzle 84 is received in the passage through the base and, at one end, extends into the interior of the housing, and at the other end, extends outside the housing. The nozzle has a threaded portion 84a which engages the threaded portion of the passage 72f and a smaller unthreaded portion 84b slidably received in the unthreaded portion of the passage 72g. At the end adjacent the threaded portion 84a, the nozzle has a head 84c. A longitudinal passage 84d extends through the unthreaded portion 84b from the end of the nozzle to a lateral passage 84e. A circumferential groove 84f circles the nozzle and opens into the lateral passage 84e.

Sealing rings 84g of rubber-like material seat in grooves encircling the nozzle above and below the groove 84f.

Pipe 86 leading from a source of high pressure air 88 is connected to the side of the housing base 72d by fitting 90 as shown in Figure 4. Pipe 86 has a restriction 92. Pipe 94 is connected to pipe 86 between the restriction 92 and the base 72d and leads to a totalizer 93 which in turn is connected to pressure gauge 96. A passage 97 in the base 72d connects fitting 90 to the interior of the housing. The other sensing element is similarly connected to the totalizer 93 so that the output of the totalizer, which is measured by gauge 96, is directly proportional to the total weight carried by the weigh carriage.

Discharge pipe 98 connects to the side of the base 72d of the housing by fitting 99. A passage 95 leads from the fitting to the circumferential groove 84f on the nozzle.

In the operation of the scale conveyor of the present invention the conveyor belt is driven so that the upper portion 22a travels in the direction indicated by the arrow A in Figure 2. The upper portion 22a of the belt slides over the lateral bars 40a and 40b as shown in Figure 3. Before any load is applied to the conveyor belt the clamp bolts 70a are loosened to permit the weigh carriage 42 to move in relation to the sensing element feeler rod 78. The height of the weigh carriage 42 in relation to the frame is then adjusted by the finely threaded set screws 60 to bring the top surface of the carriage even with the top surface of bars 40a and 40b. With the set screws 60 so adjusted the springs 54a, 54b, 54c and 54d carry the tare weight of the conveyor belt.

Air under pressure passes from the source 88 into the interior of the housing 72, through the nozzle passages 84d and 84e and out the discharge pipe 98. It will be noted that the discharge opening at the upper end of passage 84d will be restricted when the clearance between the pressure plate 76b and the nozzle 84 is reduced. Since the elevation of the pressure plate 76b is dependent on the pressure inside the housing 72, and the pressure in the housing is dependent on the inflow and discharge of the air, the discharge plate will assume a position above the nozzle where a relatively constant pressure will be sustained inside the housing. By raising or lowering the threaded nozzle 84 the pressure sustained inside the housing can be accordingly altered. Thus nozzle 84 in each sensing element 68 is adjusted so that the air pressure inside the housing is at a level to register zero on the calibrated scale of the pressure gauge 96, which is preferably about three pounds per square inch above atmospheric pressure.

After these adjustments have been made bolts 70a are tightened to secure the feeler rods 78 of the sensing elements 68 to the weigh carriage 42.

Material which is fed into the hopper 30 drops onto the upper portion 22a of the conveyor belt and is carried over the weigh carriage. The weight of the material will depress the carriage 42 and hence the feeler rod 78 which is connected to the carriage. This lowers the pressure plate 76b to reduce its clearance with nozzle 84 and restrict the nozzle discharge passage 84d. The air from source 88 continues to fill the inside of housing 72 until a pressure builds up sufficient to lift the pressure plate 76b in relation to the nozzle 84. The pressure plate 76b will be sustained in equilibrium above the nozzle 84 with the force applied to pressure plate 76b equalling the weight of the load carried on the conveyor or belt 22a. The pressure gauge 96 will measure the pressure in the housing 72, which will be proportional to the forces exerted on the pressure plates 76b, and the gauge 96 may be calibrated to read directly in pounds to give the weight of the load carried. It should be noted that if a large load is suddenly dropped on the weigh carriage 42, the spring 74a will yield, permitting the housing—and hence the nozzle—to yield under the excessive thrust of the feeler rod 78, to preserve the sensing element from damage.

The air pressure from the respective sensing elements 68 is fed to the totalizer 93, the output of which is proportional to the total weight of the load on the weigh carriage 42. This totalizer may be any of the constructions known to the art. The output of the totalizer 93 is measured by the calibrated pressure gauge 96 to give the total weight in pounds. Or a recording pressure gauge (not shown) can be connected to the totalizer 93 to record the time variations of the total load crossing the weigh carriage 42. With an integrator attached to the pressure gauge the total weight cross the weigh carriage over a period can be ascertained. If desired the output of the totalizer can be fed to a controller which regulates the speed of the conveyor belt to control the quantity of material carried by the belt.

When the frame of the scale conveyor is aligned in the horizontal position the upper portion of the belt will be in a horizontal plane and the carriage supporting springs will operate vertically. However, the conveyor frame may be installed at an angle to the horizontal, with the conveyor belt at the same angle and the carriage support springs operating in a direction normal to the upper portion of the conveyor belt. While it is not necessary that the conveyor belt lie in a horizontal plane, it is necessary for weighing action that the belt have a horizontal component of its length. Moreover, the angle the conveyor belt makes with the horizontal cannot be so great that the material conveyed will slide in relation to belt under the force of gravity. The magnitude of this limiting angle will, of course, be determined by the coefficient of friction between the conveyor belt and the material conveyed. In the appended claims I have referred to the belt as extending in an effective horizontal direction to indicate that it has a horizontal component of its length.

In the appended claims and in this description I have referred to the weight of the carriage 42 being carried solely by springs 54a to 54d because these springs are initially adjusted to carry the carriage and the belt when the belt carries no load. When load is carried by the belt the units 68 carry the weight of the load itself. It will, of course, be understood that some small zero load pressure will in practical cases be required in the units 68, but this is small in relation to the pressure associated with the load carried.

While I have shown and described specific embodiments of the present invention it will, of course, be evident that various modifications and alternative constructions may be made without departing from the true spirit and scope thereof. I therefore intend by the appended claims to cover all such modifications and alternative constructions as come within their true spirit and scope.

What I claim as new and desire to secure by Letters Patent of the United States is:

1. A device for conveying and weighing material comprising in combination: an elongated frame having a longitudinal axis with longitudinally spaced rollers having their axes perpendicular to the axis of the longitudinal frame; a continuous conveyor belt carried by the rollers, the upper portion of the belt extending in an effective horizontal direction and depressible under the weight of material carried thereon; a plurality of vertically depressible springs supported by the frame; a carriage within the frame extending substantially the width of the belt, the carriage lying in a plane generally parallel to the upper portion of the belt and carried when the belt is empty solely by the springs; means for vertical adjustment of the carriage to an initial position immediately below the upper portion of the conveyor belt when the belt is empty; means to hold the carriage in a substantially fixed longitudinal position in relation to the frame; a sensing element connected to the frame having a movable feeler rod connected to the carriage; a source of fluid under pressure; means responsive to the depression of the feeler rod to regulate the pressure in the sensing element to restore the feeler rod and carriage to essentially their initial position; and means responsive to the pressure of said fluid in the sensing element to indicate the weight of the material carried on the conveyor.

2. A device for conveying and weighing material comprising in combination: an elongated frame having a movable conveyor belt extending in an effective horizontal direction; vertically operating springs supported by the frame; a carriage mounted beneath the belt and adapted to support a portion thereof, the carriage being supported solely by the springs when the belt is empty and responsive to the weight of the belt and its contents; means to vertically adjust the carriage to an initial position; fluid operated means operable to restore the carriage to essentially the predetermined initial position; a source of fluid under pressure; means responsive to depression of the carriage to regulate the pressure in said last means as required to restore the carriage to essentially its initial position; and indicator means responsive to the pressure of said fluid in said fluid operated means.

3. A device for conveying and weighing material comprising in combination: a frame having a movable conveyor belt extending in an effective horizontal direction; a carriage mounted beneath the belt and adapted to support a portion thereof; vertically yieldable means supporting the carriage to respond to weight of the belt and its contents, said means including spring elements and constituting the sole vertical support for the carriage when the belt is empty; fluid operated means operable to restore the carriage to essentially its predetermined initial position; a source of fluid under pressure; means responsive to depression of the carriage to regulate the pressure in said last means as required to restore the carriage to essentially its initial position; and indicator means responsive to the pressure of said fluid in said fluid operated means.

4. A device for weighing material on a travelling conveyor belt comprising in combination: a frame having fixed supports underlying the belt in spaced positions longitudinally thereof; a carriage received between the supports in vertically movable position to support the belt and contents thereof when in vertically aligned position with respect to the fixed supports; a plurality of vertically adjustable springs adapted to support the carriage in position to sustain the weight of the empty belt; a sensing element connected to the frame and carriage, the element having a feeler responsive to the relative vertical positions of the frame and carriage, and fluid operated means responsive to the depression of the feeler operable to exert upward fluid pressure on the carriage as required to restore the carriage to belt and load carrying vertical position; means responsive to the pressure of fluid in said sensing element to indicate the weight of the material carried on the conveyor; generally horizontal links pivotably attached to the frame and to the carriage in the two trailing regions with reference to belt movement; and tension springs linked respectively to the frame and to the carriage at the leading portions with reference to belt movement to exert longitudinal pull on the links and hold the carriage in centered position with reference to the frame without obstructing the freedom of the carriage to move up and down.

References Cited in the file of this patent

UNITED STATES PATENTS

| | | |
|---|---|---|
| 998,974 | Messiter | July 25, 1911 |
| 1,074,123 | Kinne | Sept. 30, 1913 |
| 1,928,065 | Litle | Sept. 26, 1933 |
| 1,965,302 | Wagner | July 3, 1934 |
| 2,394,593 | Christmann | Feb. 12, 1946 |
| 2,422,167 | Hem | June 10, 1947 |
| 2,451,451 | Tate | Oct. 12, 1948 |
| 2,661,091 | Maloney | Dec. 1, 1953 |
| 2,668,702 | Belknap | Feb. 9, 1954 |